(12) United States Patent
Zhen et al.

(10) Patent No.: US 9,161,020 B2
(45) Date of Patent: Oct. 13, 2015

(54) 3D VIDEO SHOOTING CONTROL SYSTEM, 3D VIDEO SHOOTING CONTROL METHOD AND PROGRAM

(71) Applicant: Bi2-Vision Co., Ltd., Yokohama-shi (JP)

(72) Inventors: Zining Zhen, Yokohama (JP); Xiaolin Zhang, Yokohama (JP)

(73) Assignee: B12-VISION CO., LTD., Yokohama-Shi (JP)

( * ) Notice: Subject to any disclaimer, the term of this patent is extended or adjusted under 35 U.S.C. 154(b) by 298 days.

(21) Appl. No.: 13/871,179

(22) Filed: Apr. 26, 2013

(65) Prior Publication Data

US 2014/0320606 A1    Oct. 30, 2014

(51) Int. Cl.
*H04N 13/00*    (2006.01)
*H04N 13/02*    (2006.01)

(52) U.S. Cl.
CPC ....... *H04N 13/0296* (2013.01); *H04N 13/0239* (2013.01)

(58) Field of Classification Search
CPC .......... H04N 13/0239; H04N 13/0271; H04N 13/0282
See application file for complete search history.

(56) References Cited

U.S. PATENT DOCUMENTS

| | | | | |
|---|---|---|---|---|
| 5,625,408 A | * | 4/1997 | Matsugu et al. | 348/42 |
| 5,699,108 A | * | 12/1997 | Katayama et al. | 348/47 |
| 5,798,791 A | * | 8/1998 | Katayama et al. | 348/218.1 |
| 6,762,794 B1 | * | 7/2004 | Ogino | 348/262 |
| 8,085,293 B2 | * | 12/2011 | Brodsky et al. | 348/49 |
| 8,294,711 B2 | | 10/2012 | Yahagi | |
| 8,922,636 B1 | * | 12/2014 | Belden et al. | 348/77 |
| 2011/0074928 A1 | * | 3/2011 | Misawa | 348/47 |
| 2011/0221869 A1 | * | 9/2011 | Yamaya et al. | 348/47 |
| 2011/0234767 A1 | * | 9/2011 | Tokiwa | 348/47 |
| 2012/0026297 A1 | * | 2/2012 | Sato | 348/47 |
| 2012/0044327 A1 | * | 2/2012 | Horita et al. | 348/47 |
| 2012/0050322 A1 | * | 3/2012 | Sato | 345/630 |
| 2012/0236125 A1 | * | 9/2012 | Umezawa et al. | 348/47 |
| 2012/0320163 A1 | | 12/2012 | Yahagi | |
| 2012/0327197 A1 | * | 12/2012 | Yamashita et al. | 348/50 |
| 2013/0002826 A1 | * | 1/2013 | Ishiyama et al. | 348/46 |
| 2013/0259318 A1 | * | 10/2013 | Barrett et al. | 382/107 |
| 2013/0329015 A1 | * | 12/2013 | Pulli et al. | 348/47 |
| 2013/0335599 A1 | * | 12/2013 | Zhang | 348/239 |
| 2014/0028802 A1 | * | 1/2014 | Hendrickson et al. | 348/47 |
| 2014/0036039 A1 | * | 2/2014 | McNally et al. | 348/47 |

FOREIGN PATENT DOCUMENTS

| | | |
|---|---|---|
| JP | 60-236394 | 11/1985 |
| JP | 2010-081010 | 4/2010 |
| JP | 2011-250022 | 12/2011 |

* cited by examiner

*Primary Examiner* — Victor Kostak
(74) *Attorney, Agent, or Firm* — Lex IP Meister, PLLC

(57) ABSTRACT

The present invention provides a 3D video shooting control system which controls the position and direction of a pair of imaging devices in order to obtain a suitable 3D effect or maintain the safety, taking the shooting condition and the viewing condition into consideration comprehensively. A base-line length and a convergence angle of a pair of imaging devices are controlled based on an integration model in which a 3D shooting and broadcasting model and a 3D object model are integrated. A base-line length determination unit 6d-1 determines a base-line length based on the relationship expressed by an integration model equation 1 and a camera control unit 6e moves the pair of imaging devices to change the position thereof so that the pair of imaging devices has the determined base-line length.

19 Claims, 6 Drawing Sheets

3D VIDEO SHOOTING CONTROL SYSTEM, 3D VIDEO SHOOTING CONTROL METHOD AND PROGRAM

BACKGROUND OF THE INVENTION

1. Field of the Invention

The present invention relates to a system for controlling a position and a direction of an imaging device (a camera) for shooting a 3D video.

2. Description of the Related Art

Three-dimensional (3D) videos capable of achieving stereoscopic representation have been often used in a variety of fields in recent years, as typified by 3D movies and 3D televisions. Such 3D videos are generally taken by a pair of 3D shooting cameras (a camera for left-eye image and a camera for right-eye image).

The pair of 3D shooting cameras is consistently fixed at a position, and the shooting is done in that situation. Furthermore, in such case, the interval (base-line length) of about 65 mm is generally kept between the 3D shooting cameras so that the problems such as a miniature landscape effect (giant vision) do not arise. Furthermore, the relationship between the interval between the 3D shooting cameras and the angle of view thereof is adjusted manually (for example, operated by a user's hand).

Japanese Unexamined Patent Application Publication No. 2010-81010 titled "THREE-DIMENSIONAL IMAGING DEVICE, METHOD, AND PROGRAM" discloses the adjustment of the base-line length for obtaining the 3D effect as described above, which describes the fact that the base-line length of two 3D shooting cameras is adjusted in order to obtain the stereoscopic effect of a 3D video.

SUMMARY OF THE INVENTION

By way of the method of shooting by means of two 3D shooting cameras as described above, namely the method of shooting in which the interval between the cameras is fixed and the relationship between the interval and the angle of view is adjusted manually, only 3D videos at close range can be shot basically.

Since the shooting of a distant object requires the use of a zoom or telephoto lens, the setting of the interval between the cameras to be 65 mm at that time cannot obtain a stereoscopic effect of an object to be shot. Thus, in the conventional 3D shooting, the shooting condition including the interval between the cameras and the angle of view is presently set depending on the experience and sense of a person who takes a shot (such as a camera operator or a 3D grapher).

For example, in the conventional 3D shooting method, there is a difference in the stereoscopic effect between the 3D shooting of the close scene and that of the distance scene. In particular, it is significantly difficult to carry out the 3D shooting of sports and the like in which it is hard to get a closer shot thereof.

However, no relational expression has been provided so far which represents a suitable relationship of the shooting condition such as the angle of view and base-line length of cameras, a convergence angle, a distance to an object, and so on. Furthermore, no theoretical system of the 3D shooting system has been established which takes into consideration the shooting condition and the viewing condition comprehensively. Moreover, there is no definite relationship expression of the shooting condition which takes into consideration both a safe parallax (such as the parallax within the range of 50 mm) and the 3D effect, so that the setting of the base-line length and angle of view of the camera must be depend on the experience and sense of a person who takes a shot.

As described above, in the conventional technique including the aforementioned Patent Document 1, there are no relational expressions for acquiring a suitable shooting condition in the 3D shooting and no suitable control method which is specifically indicated. The aforementioned Patent Document 1 discloses the fact that the base-line length between two 3D shooting cameras is varied in order to resolve the problem in which it is impossible to view a shot image stereoscopically upon carrying out the zoom operation. However, any specific description is not included regarding based on what kind of information the base-line length after varied is determined.

Therefore, an object of the present invention is to provide a 3D video shooting control system which controls at least one of the position and direction of a pair of cameras in order to obtain a suitable 3D effect or maintain the safety, taking the shooting condition and the viewing condition into consideration comprehensively.

In order to solve the problems described above, firstly all the parameters related to the 3D effect and the safe parallax are theoretically extracted with regard to two 3D shooting cameras, and the relationship thereof is expressed by equations. Then, the parameter that requires the adjustment at the time of actual shooting (such as an object parallax, an angle of view (zoom), a convergence angle, etc.) is determined looking from a person who takes a shot, and then other parameters are calculated by relational equations based thereon. Then, each of the 3D shooting cameras is controlled based on the acquired parameters.

A first aspect of the present invention is a 3D video shooting control system for controlling a 3D video shooting. The 3D video shooting control system has a parallax calculation unit for calculating a parallax regarding an object from a video obtained from a pair of imaging devices, the imaging devices taking a shot of the object; a base-line length determination unit for determining a base-line length of the pair of imaging devices; and a base-line length control unit for controlling the pair of imaging devices to move so that the base-line length thereof is the determined base-line length. Here, it is structured that the base-line length determination unit determines the base-line length of the pair of imaging devices based on the relationship between a ratio between the base-line length of the pair of imaging devices and a base-line length between human eyes, and a ratio (a drawing ratio) between a distance (an actual distance) from the base-line of the pair of imaging devices to an object at the time of shooting and a distance (a sensing distance) from a base-line length between human eyes to an object at the time of viewing the 3D video, the relationship corresponding to each other by a predetermined function, and the sensing distance is acquired based on the parallax.

By means of the 3D video shooting control system according to the first embodiment of the present invention described above, the base-line length by which a suitable 3D effect can be obtained is acquired based on "the relationship in which a ratio between a base-line length of a pair of imaging devices and a base-line length between human eyes corresponds to a drawing ratio by a predetermined function", and the base-line length of a pair of imaging devices (cameras) is adjusted to be the determined length. In addition, the base-line length between human eyes may be a preset constant, other than that designated by a user and the like.

A second aspect of the present invention is the 3D video shooting control system according to the first aspect, further including a parallax receiving unit for receiving a designated parallax; and a convergence angle control unit for controlling the pair of imaging devices to move in order to adjust a convergence angle. Here, it is structured that the convergence angle control unit moves the pair of imaging devices so as to obtain the convergence angle corresponding to the designated parallax; and the base-line length determination unit determines the sensing distance based on the designated parallax.

By means of the 3D video shooting control system according to the second embodiment of the present invention described above, the convergence angle and the base-line length are determined so as to obtain a suitable 3D effect, based on the parallax when it is designated by a user and the like, and thus the convergence angle and the base-line length of a pair of imaging devices (cameras) are adjusted to be the determined base-line length and convergence angle.

A third aspect of the present invention is the 3D video shooting control system according to the first aspect, further including a drawing ratio receiving unit for receiving the designated drawings ratio; and a convergence angle control unit for controlling the pair of imaging devices to move in order to adjust a convergence angle. Here, it is structured that the convergence angle control unit moves the pair of imaging devices so as to obtain the convergence angle corresponding to the parallax obtained based on the designated drawing ratio; and the base-line length determination unit determines the base-line length of the pair of imaging devices based on the designated drawing ratio.

By means of the 3D video shooting control system according to the third embodiment of the present invention described above, the convergence angle and the base-line length are determined so as to obtain a suitable 3D effect, based on the drawing ratio when it is designated by a user and the like, and thus the convergence angle and the base-line length of a pair of imaging devices (cameras) are adjusted to be the determined base-line length and convergence angle.

A fourth aspect of the present invention is the 3D video shooting control system according to the first aspect, further including a convergence angle control unit for controlling the pair of imaging devices to move in order to adjust a convergence angle. Here, it is structured that the drawing ratio is acquired from the angle of view based on the relationship in which the drawing ratio multiplied by the angle of view of the pair of imaging devices equals a constant; the convergence angle control unit moves the pair of imaging devices so as to obtain the convergence angle corresponding to the parallax obtained based on the acquired drawing ratio; and the base-line length determination unit determines the base-line length of the pair of imaging devices based on the determined drawing ratio.

By means of the 3D video shooting control system according to the fourth embodiment of the present invention described above, the drawing ratio is acquired based on "the relationship in which the drawing ratio multiplied by the angle of view of the pair of imaging devices equals a constant", and the base-line length and the convergence angle are acquired based on the relationship different from such relationship (i.e., "the relationship in which the ratio between the base-line length of the pair of imaging devices and the base-line length between human eyes corresponds to the drawing ratio by a predetermined function"). The convergence angle and the base-line length acquired in this manner brings a suitable 3D effect, and the convergence angle and the base-line length of the pair of imaging devices (cameras) are adjusted to be the determined base-line length and convergence angle.

A fifth aspect of the present invention is the 3D video shooting control system according to the fourth aspect, wherein it is structured that the angle of view is measured by an angle of view measurement unit for measuring an angle of view, or calculated by a focal distance and an imaging element width in the pair of imaging devices.

A sixth aspect of the present invention is the 3D video shooting control system according to the fourth or fifth aspect, further including a breadth magnification ratio receiving unit for receiving a designated breadth magnification ratio. Here, it is structure that the drawing ratio is acquired from the angle of view and the breadth magnification ratio based on the relationship in which the drawing ratio multiplied by the angle of view of the pair of imaging devices, and by the designated breadth magnification ratio equals a constant.

A seventh aspect of the present invention is the 3D video shooting control system according to the first to sixth aspects, further including a depth-to-breadth ratio receiving unit for receiving a designated depth-to-breadth ratio. Here, it is structured that the base-line length determination unit determines the base-line length of the pair of imaging devices based on the relationship in which a ratio between the base-line length of the pair of imaging devices and the base-line length between human eyes is proportional to the multiplication of the drawing ratio by the depth-to-breadth ratio.

A seventh aspect of the present invention is the 3D video shooting control system according to the second to seventh aspects, further including an acceptable parallax range receiving unit for receiving a designated acceptable parallax range; and a shooting condition adjustment unit for adjusting various parameters so that the parallax falls within the acceptable parallax range. Here, it is structured that the parallax calculation unit calculates the parallax of the entire image in a video obtained from the pair of imaging devices; and the shooting condition adjustment unit determines at least one of the acceptable range with regard to the base-line length of the pair of imaging devices and the acceptable range with regard to the convergence angle in accordance with the parallax range of the calculated entire image and the acceptable parallax range, and adjusts the base-line length of the pair of imaging devices or the convergence angle to be within the determined acceptable range.

By means of the 3D video shooting control system according to the eighth embodiment of the present invention described above, the base-line length and the convergence angle of the cameras are controlled so that the 3D video shooting is carried out within the safe parallax range.

A ninth aspect of the present invention is the 3D video shooting control system according to the first to eighth aspects, wherein it is structured that the base-line length determination unit acquires the sensing distance based on the parallax and the viewing condition; and the viewing condition includes a base-line length between human eyes, a screen width, and a distance from the base-line length between human eyes to the screen.

A tenth aspect of the present invention is the 3D video shooting control system according to the first to ninth aspects, wherein it is structured that the actual distance is measured by an actual distance measurement unit for measuring the actual distance, or is acquired by the parallax, the base-line length of the pair of imaging devices, the convergence angle, and the angle of view.

A eleventh aspect of the present invention is the 3D video shooting control system according to the first to tenth aspects, wherein it is structured that the control of the 3D video shooting is carried out for each of two or more pairs of imaging devices composed of three or more imaging devices for shooting the object.

A twelfth aspect of the present invention is a method of 3D video shooting control for controlling a 3D video shooting. The method of 3D video shooting control includes the steps of: a parallax calculation for calculating the parallax with regard to an object from a video obtained from a pair of imaging devices for shooting the object; a base-line length determination for determining a base-line length of the pair of imaging devices; and a base-line length control for controlling the pair of imaging devices to move so that the base-line length thereof is the determined base-line length. Here, it is structured that the base-line length determination step determines the base-line length of the pair of imaging devices based on the relationship between a ratio between the base-line length of the pair of imaging devices and a base-line length between human eyes, and a ratio (a drawing ratio) between a distance (an actual distance) from the base-line of the pair of imaging devices to an object at the time of shooting and a distance (a sensing distance) from a base-line length between human eyes to an object at the time of viewing the 3D video, the relationship corresponding to each other by a predetermined function, and the sensing distance is acquired based on the parallax.

A thirteenth aspect of the present invention is the method of a 3D video shooting control according to the twelfth aspect, further including the steps of: a parallax reception for receiving a designated parallax; and a convergence angle control for controlling the pair of imaging devices to move in order to adjust a convergence angle. Here, it is structured that the convergence angle control step moves the pair of imaging devices so as to obtain the convergence angle corresponding to the designated parallax; and the base-line length determination step determines the sensing distance based on the designated parallax.

A fourteenth aspect of the present invention is the method of a 3D video shooting control according to the twelfth aspect, further including the steps of: a drawing ratio reception for receiving the designated drawings ratio; and a convergence angle control for controlling the pair of imaging devices to move in order to adjust a convergence angle. Here, it is structured that the convergence angle control step moves the pair of imaging devices so as to obtain the convergence angle corresponding to the parallax obtained based on the designated drawing ratio; and the base-line length determination step determines the base-line length of the pair of imaging devices based on the designated drawing ratio.

A fifteenth aspect of the present invention is the method of a 3D video shooting control according to the twelfth aspect, further comprising the steps of convergence angle control for controlling the pair of imaging devices to move in order to adjust a convergence angle. Here, it is structured that the drawing ratio is acquired from the angle of view based on the relationship in which the drawing ratio multiplied by the angle of view of the pair of imaging devices equals a constant; the convergence angle control step moves the pair of imaging devices so as to obtain the convergence angle corresponding to the parallax obtained based on the acquired drawing ratio; and the base-line length determination step determines the base-line length of the pair of imaging devices based on the determined drawing ratio.

A sixteenth aspect of the present invention is a program for carrying out the 3D video shooting control for controlling a 3D video shooting, the program making a computer function as: a parallax calculation unit for calculating a parallax regarding an object from a video obtained from a pair of imaging devices, the imaging devices taking a shot of the object; a base-line length determination unit for determining a base-line length of the pair of imaging devices; and a base-line length control unit for controlling the pair of imaging devices to move so that the base-line length thereof is the determined base-line length. Here, it is structured that the base-line length determination unit determines the base-line length of the pair of imaging devices based on the relationship between a ratio between the base-line length of the pair of imaging devices and a base-line length between human eyes, and a ratio (a drawing ratio) between a distance (an actual distance) from the base-line of the pair of imaging devices to an object at the time of shooting and a distance (a sensing distance) from a base-line length between human eyes to an object at the time of viewing the 3D video, the relationship corresponding to each other by a predetermined function, and the sensing distance is acquired based on the parallax.

A seventeenth aspect of the present invention is the program according to the sixteenth aspect, the program further making the computer function as: a parallax reception unit for receiving a designated parallax; and a convergence angle control unit for controlling the pair of imaging devices to move in order to adjust a convergence angle. Here, it is structured that the convergence angle control step moves the pair of imaging devices so as to obtain the convergence angle corresponding to the designated parallax; and the base-line length determination step determines the sensing distance based on the designated parallax.

A eighteenth aspect of the present invention is the program according to the sixteenth aspect, the program further making the computer function as: a drawing ratio receiving unit for receiving the designated drawings ratio; and a convergence angle control unit for controlling the pair of imaging devices to move in order to adjust a convergence angle. Here, it is structured that the convergence angle control unit moves the pair of imaging devices so as to obtain the convergence angle corresponding to the parallax obtained based on the designated drawing ratio; and the base-line length determination unit determines the base-line length of the pair of imaging devices based on the designated drawing ratio.

A nineteenth aspect of the present invention is the program according to the sixteenth aspect, the program further making the computer function as a convergence angle control unit for controlling the pair of imaging devices to move in order to adjust a convergence angle. Here, it is structured that the drawing ratio is acquired from the angle of view based on the relationship in which the drawing ratio multiplied by the angle of view of the pair of imaging devices equals a constant; the convergence angle control unit moves the pair of imaging devices so as to obtain the convergence angle corresponding to the parallax obtained based on the acquired drawing ratio; and the base-line length determination unit determines the base-line length of the pair of imaging devices based on the determined drawing ratio.

By means of the 3D video shooting control system according to the present invention, a parameter is acquired taking the shooting condition and the viewing condition into consideration comprehensively, and at least one of the position and direction of a pair of cameras is controlled in order to obtain a suitable 3D effect by means of the obtained parameter or maintain the safety.

DESCRIPTION OF THE PREFERRED EMBODIMENTS

A 3D video shooting control system according to an embodiment of the present invention controls at least one of an interval (a base-line length) between a pair of cameras for 3D imaging and a direction (a convergence angle) thereof based on a shooting condition and a viewing condition in order to obtain a suitable 3D effect or to achieve a suitable safe parallax.

First, a 3D video shooting control system 7 according to an embodiment of the present invention and a device for displaying a 3D video data obtained by the 3D video shooting control system 7 to show it to a viewer will be described with reference to FIG. 1.

Figure 1:
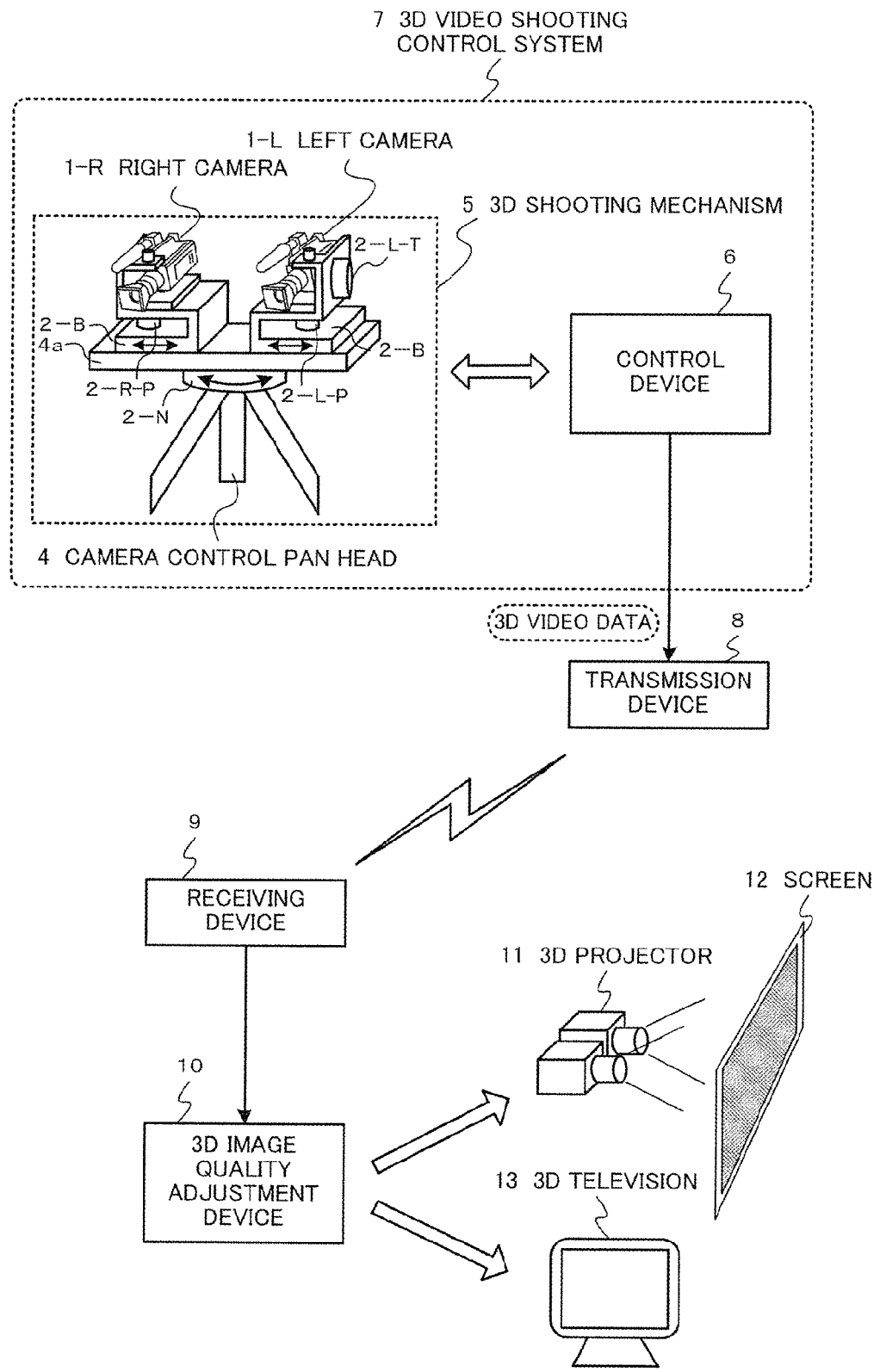
FIG. 1 is a schematic diagram showing a summary of a 3D video shooting control system and the other devices associated therewith according to an embodiment of the present invention.

The 3D video shooting control system 7 in FIG. 1 includes a 3D shooting mechanism 5 and a control device 6, and the 3D shooting mechanism 5 includes cameras (camera set) 1, an actuator 2, a movement amount measurement device 3 (refer to FIG. 2), and a camera control pan head 4. The cameras 1 are imaging devices for shooting a 3D video, which includes a pair of cameras, i.e., a left-image shooting camera 1-L and a right-image shooting camera 1-R. The cameras included in the cameras 1 are directly controlled to work with each other to carry out some of operations such as zoom, without involving the control device 6. These two cameras are referred to as the cameras 1 herein when indicating them collectively.

The actuator 2 moves the camera (each of the left-image shooting camera 1-L and the right-image shooting camera 1-R) in response to a control signal from the control device 6. The actuator 2 makes the cameras 1 accomplish the rotational movements in three axial directions and the horizontal movement in the base-line direction. Although this example utilizes the actuator 2 as a movement unit, the camera included in the cameras 1 can be moved to any position and in any direction by means of other known units. The movement amount measurement device 3 measures an amount of movement of the camera (the rotation angle and the movement distance) moved by the actuator 2 and transmits the measured result to the control device 6.

Two cameras are arranged next to each other at the same level basically on a base board 4a of the camera control pan head 4. The left-image shooting camera 1-L is attached on the base board 4a in the state capable of rotationally moving in three axial directions and horizontally moving in the base-line direction by means of the actuator 2. Similarly, the right-image shooting camera 1-R is also attached on the base board 4a in the state capable of rotationally moving in three axial directions and horizontally moving in the base-line direction by means of the actuator 2. Furthermore, the base board 4a is attached to the camera control pan head 4 in the state capable of pan rotation.

The control device 6 carries out a predetermined processing to the 3D video data received from the cameras 1 and then transmits it to a transmission device 8. Then, the 3D video data is transmitted to a receiving device 9 (that is remote from the transmission device 8, for example) via a network such as the Internet and WAN, and further sent to a 3D image quality adjustment device 10 located in a theatre, a broadcast station, a relay station, a home, and so on. The 3D image quality adjustment device 10 carries out the image quality adjustment of the 3D video data and other video processing.

Next, the 3D video data that has undergone the image quality adjustment and video processing is provided for a viewer to see. For example, as shown in FIG. 1, in a theatre, the 3D video data is transmitted to a 3D projector 11 and the 3D video is projected from the 3D projector 11 to a screen 12. On the other hand, in an ordinary home, the transmitted 3D vide data is displayed on a monitor of a 3D television 13.

Although an example in FIG. 1 shows the 3D video shooting control system 7 that is structured to include the 3D shooting mechanism 5, it may be structured not to be provided with the cameras 1 and the camera control pan head 4, but includes only the control device 6 for controlling the cameras 1 practically.

Next, the adjustment and movement of the position and direction of the cameras in the 3D shooting mechanism 5 will be described with reference to FIG. 2.

Figure 4A:
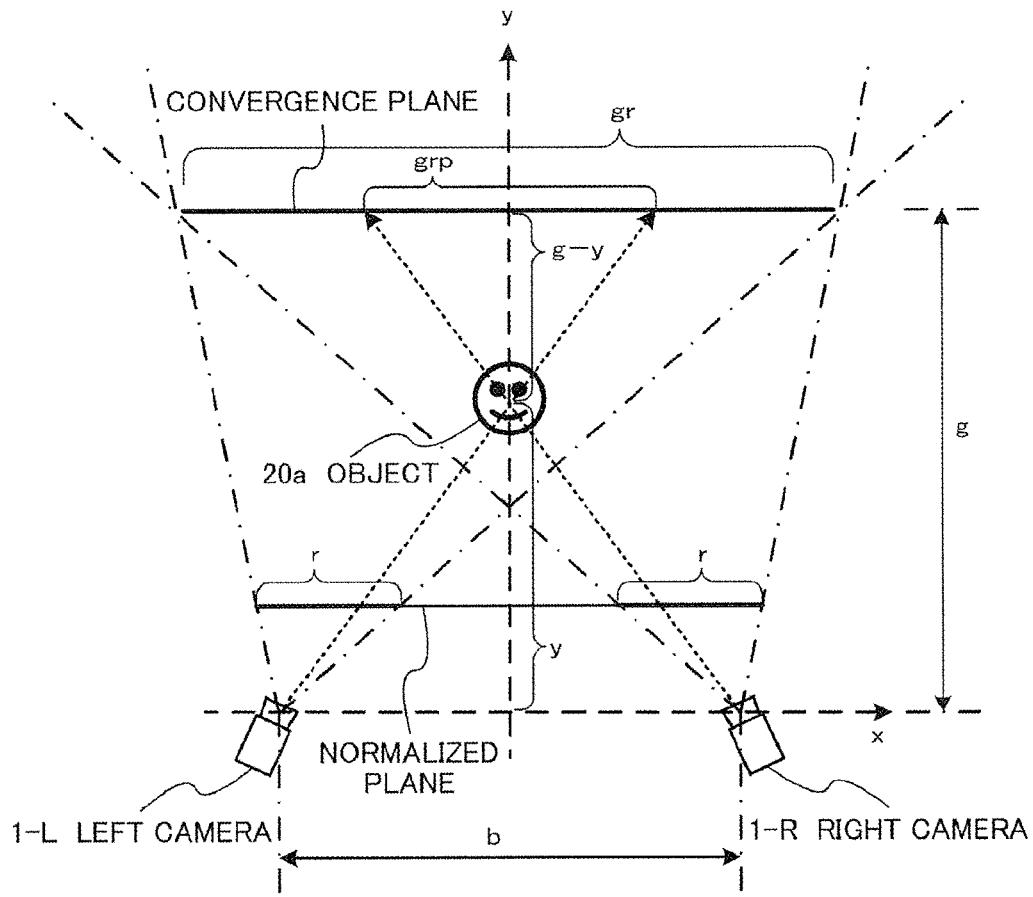
FIG. 4A and FIG. 4B are schematic diagrams for explaining an equation for acquiring an actual distance and a sensing distance with regard to the 3D video shooting control system according to an embodiment of the present invention.
Figure 4B:
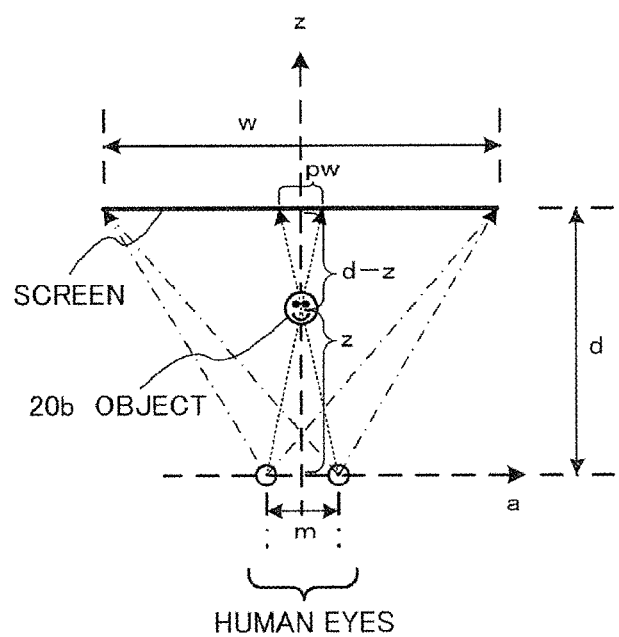

A convergence angle is one-half of an angle between an optical axis 15L of a left camera (the left-image shooting camera) 1-L and an optical axis 15R of a right camera (the right-image shooting camera) 1-R which is made on a plane including these optical axes (refer to FIG. 4A and FIG. 4B). FIG. 2 shows an object (a visual target) of the left camera 1-L and the right camera 1-R as an object 20.

The angles of the object 20 relative to the optical axis 15L of the left camera 1-L are represented by an angle in the pan direction $\phi_{l\text{-}p}$, an angle in the tilt direction $\phi_{l\text{-}t}$, and an angle in the roll direction $\phi_{l\text{-}r}$, respectively. Likewise, the angles of the object 20 relative to the optical axis 15R of the right camera 1-R are represented by an angle in the pan direction $\phi_{r\text{-}p}$, an angle in the tilt direction $\phi_{r\text{-}t}$, and an angle in the roll direction $\phi_{r\text{-}r}$, respectively.

Figure 2:
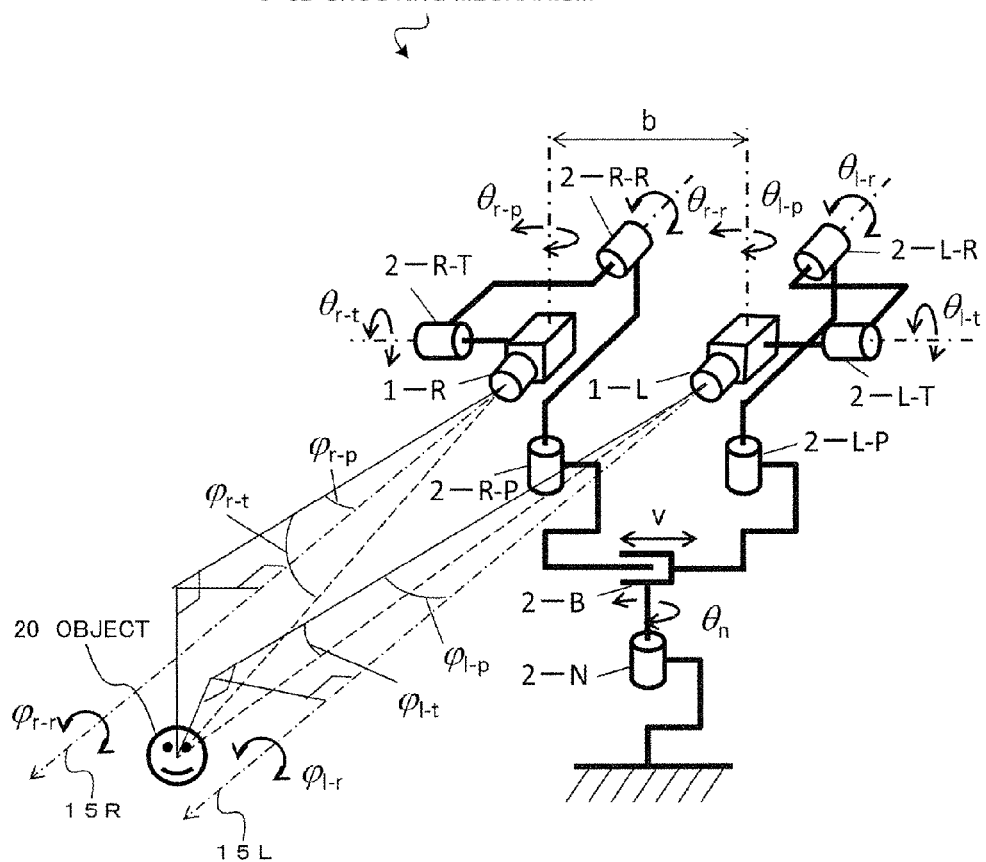
FIG. 2 is a schematic diagram schematically representing a 3D shooting mechanism of the 3D video shooting control system according to an embodiment of the present invention.

FIG. 2 shows a base-line length b between the left camera 1-L and the right camera 1-R. Here, the base-line length refers to the distance between the optical centers of two cameras (or human eyes), and the optical center refers to the position of a pinhole when the camera is regarded to be close to a pinhole model camera. Furthermore, the base-line length b also can be represented as the distance between the rotation axes of two cameras in the pan direction. Besides the above, other base point that approximates the distance described above can be used to obtain the base-line length b between two cameras (in that case, however, it is necessary to consider the parameter error).

The actuator 2 is structured to have, for example, three degrees of freedom for each of two cameras, and is arranged to rotate the cameras with regard to each of the rotation axes. The actuator 2 for varying the base-line length is also provided. Furthermore, the base board 4a on which two cameras of the cameras 1 are placed can rotate in the pan direction as described above, and the rotation can be controlled by the actuator 2.

In FIG. 2, an actuator 2-L-P is an actuator for rotating the left camera 1-L in the pan direction and the rotation angle thereof is represented by $\theta_{l\text{-}p}$, and an actuator 2-R-P is an actuator for rotating the right camera 1-R in the pan direction and the rotation angle thereof is represented by $\theta_{r\text{-}p}$. An actuator 2-L-T is an actuator for rotating the left camera 1-L in the tilt direction and the rotation angle thereof is represented by $\theta_{l\text{-}t}$, and an actuator 2-R-T is an actuator for rotating the right camera 1-R in the tilt direction and the rotation angle thereof is represented by $\theta_{r\text{-}t}$. An actuator 2-L-R is an actuator for rotating the left camera 1-L in the roll direction (the visual axis direction) and the rotation angle thereof is represented by $\theta_{l\text{-}r}$, and an actuator 2-R-R is an actuator for rotating the right camera 1-R in the roll direction (the visual axis direction) and the rotation angle thereof is represented by $\theta_{r\text{-}r}$.

An actuator 2-B is the actuator that varies the interval between two cameras (varies the base-line length), and the interval between the cameras of the cameras 1 is represented by the base-line length b, as described above. Furthermore, an actuator 2-N is the actuator that rotates the base board 4a of the camera control pan head 4 in the pan direction and the rotation angle thereof is represented by $\theta_n$.

Here, when the control signal that varies the base-line length b to be a predetermined distance is transmitted from the control device 6 shown in FIG. 1, the actuator 2-B acts to vary the base-line length to be the predetermined distance. Likewise, when the control device 6 transmits the control signal for varying the convergence angle between two cameras of the cameras 1 to a predetermined angle, the actuator 2-L-P and the actuator 2-L-R act to vary the convergence angle to be the predetermined angle.

Although the base-line length is schematically shown in FIG. 2 as the mechanism to be varied by a single actuator 2-B, it may be controlled by two actuators for moving each of cameras of the cameras 1 as shown in FIG. 1. Furthermore, two actuators (the actuator 2-L-P and the actuator 2-L-R) basically operate to rotate each of the cameras by angles equal to each other to make the predetermined convergence angle.

Furthermore, in the embodiment described herein, the position and direction of the cameras of the cameras 1 is adjusted by the actuator (a motor). However, the present invention is not limited to this, but other mechanism may move the cameras.

Figure 3A:
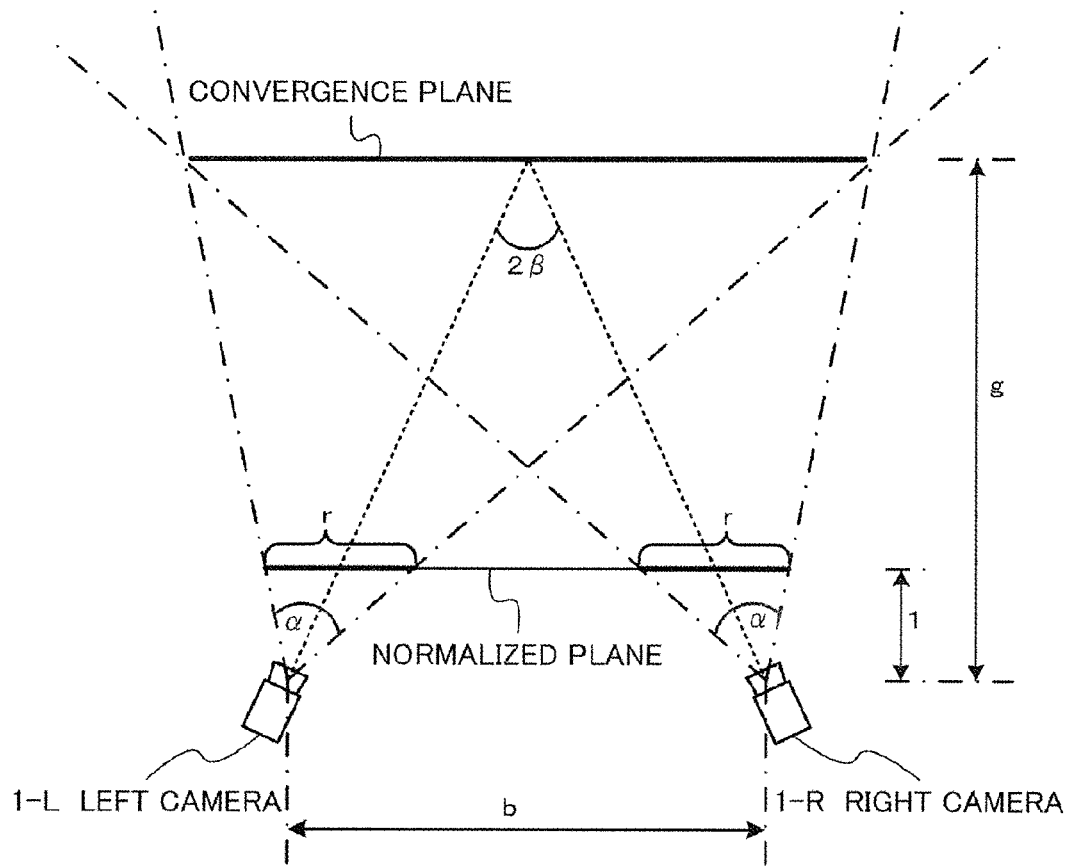
FIG. 3A and FIG. 3B are schematic diagrams for explaining a shooting condition and a viewing condition with regard to the 3D video shooting control system according to an embodiment of the present invention.

Here, the modeling with regard to the shooting and broadcasting of the 3D video will be described with reference to FIG. 3A and FIG. 3B. FIG. 3A shows a 3D shooting model in which two cameras (the left camera 1-L and the right camera 1-R) carry out the 3D shooting by way of the convergence shooting method. The left camera 1-L and the right camera 1-R are placed at the interval of the base-line length b, and one-half of an angle between the optical axes of these two cameras is represented by a convergence angle β. The angle of view of each of the left camera 1-L and the right camera 1-R is α. The plane in which the distance from the optical center of the camera (the distance of the straight line extending vertically relative to the base line from the midpoint of the base line connecting two optical centers) is 1 is referred to as a normalized plane, and the range of angle of view on the normalized plane is set to be a normalized angle of view r.

A convergent plane is the plane which passes the intersection point of the optical axes of the pair of cameras and in which the ranges of angle of view of both the cameras correspond to each other. The distance from the optical center of the camera to the convergent plane (the distance of the straight line extending vertically relative to the base line from the midpoint of the base line connecting two optical centers) is set as g. The pan operations of two cameras vary the convergence angle β and the distance g, and the zoom operations vary the angle of view α and the normalized angle of view r. Furthermore, the base-line length b and the convergence angle β determine the distance g. The base-line length b, the convergence angle β and the angle of view α are parameters indicating the shooting condition.

Figure 3B:
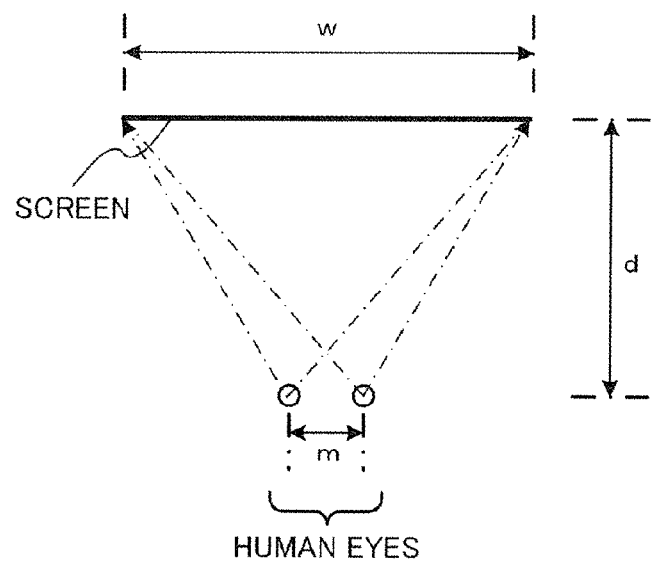

FIG. 3B shows a 3D broadcasting model in which a 3D video is broadcasted or screened to be seen by human eyes. The interval between human eyes (the distance between the optical centers) is represented by a base-line length m, and a screen width is represented by w. The distance from the optical centers of human eyes to the screen (the distance of the straight line extending vertically relative to the base line from the midpoint of the base line connecting two optical centers) is represented by d. The base-line length m of human eyes, the screen width w and the distance d between the base line of human eyes and the screen are parameters indicating the viewing condition.

Here, the normalized angle of view r is approximated by the following equation.

$$r = 2\tan(\alpha/2) \qquad \text{(Equation 1)}$$

Furthermore, the distance g is approximated by the following equation.

$$g = (b/2)\cot(\beta) \qquad \text{(Equation 2)}$$

Next, an object model in the shooting and broadcasting of the 3D video will be described with reference to FIG. 4A and FIG. 4B. FIG. 4A shows an object model corresponding to the 3D shooting model in FIG. 3A. Here, a two dimensional plane in which the midpoint of the straight line connecting the optical centers of two cameras (the base line) at the time of 3D shooting is set as an origin, the axis running from the origin to the optical center of the right camera 1-R is set as an x-axis and the axis running from the origin to the intersection point of the optical axes of two cameras is set as a y-axis is defined as a shooting plane.

In the example in FIG. 4A, an object 20a is shot by two cameras at a distance y from the base line. When two cameras (the left camera 1-L and the right camera 1-R) shoot the object 20a, the difference in the horizontal axis coordinates (a parallax) with regard to the object between the left-eye image (the image shot by the left camera 1-L) and the right-eye image (the image shot by the right camera 1-R) is calculated from the shot image, and parallax information p that is a ratio between the parallax and the screen width is acquired.

It is assumed that the coordinates of the object 20a in the shooting plane is (x, y), and y is defined as an actual distance to the object. The relationship among the actual distance y to the object 20a, the base-line length b between two cameras, the distance g from the cameras to the convergence plane, the normalized angle of view r, and the parallax information p of the object can be expressed by the following equation.

$$(g-y)/y = grp/b \qquad \text{(Equation 3)}$$

Thereby, the actual distance is acquired as follows.

$$y = bg/(b+grp) \qquad \text{(Equation 4)}$$

On the other hand, FIG. 4B shows an object model corresponding to the 3D broadcasting model in FIG. 3B. Here, a two dimensional plane in which the midpoint of the straight line connecting the optical centers of human eyes (the base line) upon a human seeing the broadcast or screening of the 3D video is set as an origin, the axis running from the origin to the optical center of the right eye is set as an a-axis and the axis extending in the vertical direction (the front direction) from the origin to the base line connecting the optical centers of human eyes is set as an z-axis is defined as a sensing plane. The plane conversion from the shooting plane into the sensing plane occurs between the 3D shooting model and the 3D broadcasting model.

In the example in FIG. 4B, an object 20b that corresponds to the object 20a shown in FIG. 4A is sensed at a distance z from the base line. It is assumed that the coordinates of the object 20b in the sensing plane is (a, z), and z is defined as a sensing distance to the object. The relationship among the sensing distance z to the object 20b, the base-line length m between human eyes, the distance d from the base line of human eyes to the screen, the screen width w, and the parallax information p of the object can be expressed by the following equation.

$$(d-z)/z = wp/m \quad \text{(Equation 5)}$$

Thereby, the sensing distance is acquired as follows.

$$z = md/(m+wp) \quad \text{(Equation 6)}$$

When a scene is shot and then broadcasted or screened, a degree in which the object looks closer than it really is (namely, a ratio between the actual distance to the object and the sensing distance of the object) is defined as a drawing ratio h, and magnification ratio of the depth of the object is defined as depth magnification ratio t. Furthermore, a magnification ratio of the breadth of the object is defined as a breadth magnification ratio s, and a ratio between the depth magnification ratio and the breadth magnification ratio is defined as a depth-to-breadth ratio q.

A miniature landscape effect (giant vision) occurs when the breadth magnification ratio is small. On the other hand, a cardboard effect occurs when the depth-to-breadth ratio is small.

Next, an integrated model will be described in which the 3D shooting model and the 3D broadcasting model and the object model described above are integrated. First, with regard to the 3D shooting model and the 3D broadcasting model, a space conversion function for converting one point (x, y) in the shooting plane into one point (a, z) in the sensing plane is acquired.

Assuming $A=m-(bw/gr)$, $B=bw/r$, $C=lw/r$, and $D=dl$, a coordinate a and a coordinate z are respectively acquired as follows.

$$a = Cx/(Ay+B) \quad \text{(Equation 7)}$$

$$z = Dy/(Ay+B) \quad \text{(Equation 8)}$$

Then, using the space conversion function described above, the drawing ratio h, the depth magnification ratio t, the breadth magnification ratio s, and the depth-to-breadth ratio q are respectively acquired with regard to the object in the scene.

$$\text{The drawing ratio } h = y/z = (Ay+B)/D \quad \text{(Equation 9)}$$

$$\text{The depth magnification ratio } t = \partial z/\partial y = BD/(Ay+B)^2 \quad \text{(Equation 10)}$$

$$\text{The breadth magnification ratio } s = \partial a/\partial x = C/(Ay+B) \quad \text{(Equation 11)}$$

$$\text{The depth-to-breadth ratio } q = t/s = BD/C(Ay+B) \quad \text{(Equation 12)}$$

Finally, the following two equations applicable to any object in a scene in any 3D shooting model and any 3D broadcasting model can be obtained as follows.

$$hq = B/C = b/m \quad \text{(Equation 13)}$$

$$hs = C/D = w/dr \quad \text{(Equation 14)}$$

Here, b/m in the equation 13 is the ratio between the base-line length b of two cameras and the base-line length m between human eyes, which is defined as a base-line length magnification ratio. Thus, the equation 13 can be expressed by the following equation 15 (an integration model equation 1).

Drawing ratio of the object×Depth-to-breadth ratio of the object=Base-line magnification ratio (Equation 15)

Furthermore, d/w in the equation 14 is the ratio between the distance from human eyes to a screen and the screen width, which is defined a viewing distance magnification ratio. Thereby, the equation 14 can be expressed by the following equation 16 (an integration model equation 2).

Drawing ratio of the object×Breadth magnification ratio of the object×Viewing distance magnification ratio×Normalized angle of view=1 (Equation 16)

Figure 5:
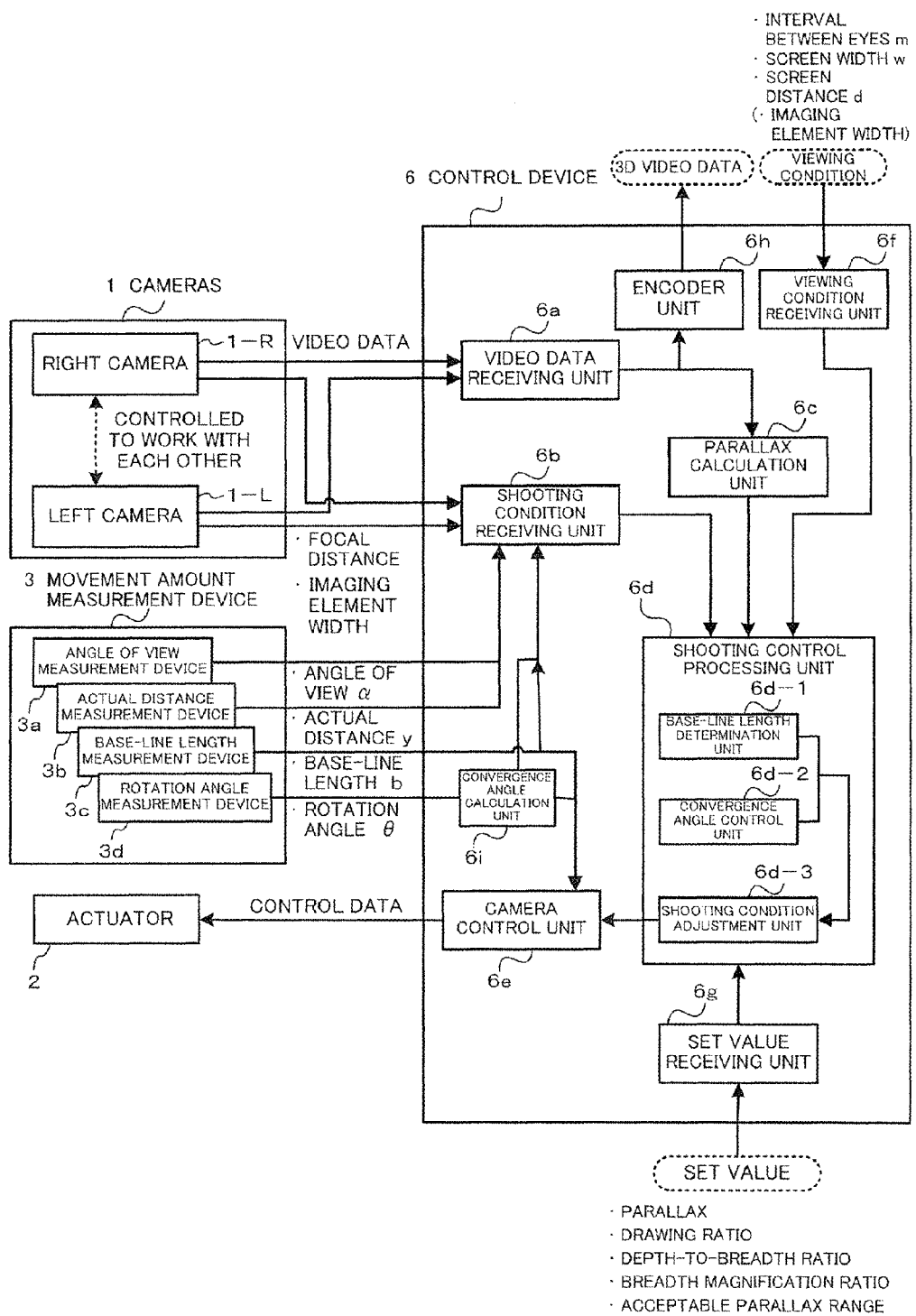
FIG. 5 is a functional block diagram regarding the 3D shooting mechanism and a control device of the 3D video shooting control system according to an embodiment of the present invention.

Next, each of functions of the control device 6 will be described with reference to FIG. 5. The control device 6 according to one embodiment of the present invention is structured to include a video data receiving unit 6a, a shooting condition receiving unit 6b, a parallax calculation unit 6c, a shooting control processing unit 6d, a camera control unit 6e, a viewing condition receiving unit 6f, a set value receiving unit 6g, an encoder unit 6h, and a convergence angle calculation unit 6i, as shown in FIG. 5. Furthermore, the shooting control processing unit 6d includes a base-line length determination unit 6d-1, a convergence angle control unit 6d-2, and a shooting condition adjustment unit 6d-3.

The video data receiving unit 6a is connected to two cameras of the cameras 1 (the left camera 1-L and the right camera 1-R) by way of a cable and the like, and receives a video data that is shot three-dimensionally using the cameras of the cameras 1 by the convergence shooting method (that is synchronized at both the left side and the right side). When required, the video data receiving unit 6a also receives data indicating an object (a coordinate data, for example) that is designated by a user or generated by automatic designation by tracking of the object and the like.

The shooting condition receiving unit 6b is connected to two cameras of the cameras 1 by way of a cable and the like, and receives parameters representing the shooting condition from the cameras of the cameras 1. Furthermore, the shooting condition receiving unit 6b is connected to the movement amount measurement device 3 (an angle of view measurement device 3a and an actual distance measurement device 3b) by way of a cable and the like, and also receives parameters representing the shooting condition from the devices. Moreover, the base-line length b, which is measured by a base-line length measurement device 3c, and the convergence angle β, which is stored in the convergence angle calculation unit 6i, are also received when required.

As parameters, a focal distance and an imaging element (imaging sensor) width are received from the cameras of the cameras 1 when required. The focal distance and the imaging element width are used when the angle of view α is calculated. Furthermore, the measured angle of view α is received from the angle of view measurement device 3a, and the measured actual distance y (from the midpoint of the base line of the cameras of the cameras 1) to the object, or a distance data used for acquiring the actual distance y is received from the actual distance measurement device 3b. The angle of view measurement device 3a and the actual distance measurement device 3b are structured to be separate devices outside of the cameras 1 in FIG. 5. For example, a laser rangefinder such as an active laser sensor can be used as the actual distance measurement device 3b, which is particularly suitable for measuring an object located within a close range when using it. However, at least a part of function parts of the angle of view measurement device 3a and the actual distance measurement device 3b may be structured to be integrated into the cameras 1.

The parallax calculation unit 6c calculates the difference in the horizontal axis coordinates (the parallax) by extracting a characteristic point from each of left and right video data of the cameras 1 received at the video data receiving unit 6a, and then matching these characteristic points. The object is a specific object in the shot video which can be designated by a variety of ways such as being selected by a camera operator or a 3D grapher at the time of shooting (by inputting using an input unit of the camera, for example) or being selected automatically. The coordinate data regarding the object that is designated in this manner is transmitted from the cameras 1 to the parallax calculation unit 6c via the video data receiving unit 6a, in the same manner as the video data.

A variety of methods can be employed as the method for extracting characteristic points, such as the characteristic point within the radius in which the object selection position exists, the characteristic point within the divided specific area, all the characteristic points (where the average of all the parallax and the weighted averaging value are regarded as a parallax), etc. Furthermore, the matching method of the characteristic points can be carried out by means of a known variety of methods such as an SIFT method.

The ratio between the parallax acquired here and the screen width w (on the basis of pixels or physical length (meter)) is acquired at the shooting control processing unit 6d described below, and the acquired value is used in the following calculation as the parallax information p.

The shooting control processing unit 6d determines the base-line length of the cameras of the cameras 1 suitable for the 3D shooting in accordance with the condition derived from the aforementioned integration models and the like so as to control the convergence angle. Furthermore, safe ranges of base-line length and convergence angle are determined. The method will be described below in detail.

The camera control unit 6e receives the base-line length determined by the base-line length determination unit 6d-1 of the shooting control processing unit 6d, and also receives the measured data from the movement amount measurement device 3 (the base-line length measurement device 3c) so as to adjust the horizontal position (the interval) of the cameras of the cameras 1 without changing the angle of the cameras of the cameras 1 so that the cameras of the cameras 1 have such base-line length. For that purpose, the camera control unit 6e transmits the control data for operating the actuator 2 to the actuator 2. For example, in order to adjust the base-line length b of the cameras of the cameras 1, the operation of the actuator 2-B is controlled (refer to FIG. 2).

The camera control unit 6e carries out the feedback control of the convergence angle β of the cameras of the cameras 1 by the convergence angle control unit 6d-2 of the shooting control processing unit 6d. The convergence angle control unit 6d-2 adjusts the angle of the cameras of the cameras 1 in response to the parallax received from the parallax calculation unit 6c. For that purpose, the camera control unit 6e transmits the control data for operating the actuator 2 to the actuator 2. In order to adjust the convergence angle β of the cameras of the cameras 1, the operations of the actuator 2-L-P and the actuator 2-R-P are controlled (refer to FIG. 2).

In the control of the actuator (the motor), for example, a digital signal output from the camera control unit 6e is D/A converted, the analog signal after converted is input to a driver of the motor, and then the motor is driven by the driver so as to move by the designated amount of movement. The movement amount measurement device 3 is, for example, a movement amount detection sensor that is placed in the motor. The rotation angle signal of the motor detected thereby is A/D converted, and the digital signal after converted is transmitted to the camera control unit 6e.

The change in the base-line length b of the cameras of the cameras 1 that results in the control by the actuator 2-B is measured by the base-line length measurement device 3c, and the measured result is transmitted to the camera control unit 6e. The camera control unit 6e uses the measured result to carry out the feedback control, the feedforward control, etc., such as PID control, with regard to the operation of the actuator 2-B.

Although the base-line length measurement device 3c and the rotation angle measurement device 3d are structured to be separate devices outside of the cameras 1 and the actuator 2 in FIG. 5 for convenience in explaining, at least a part of function parts of those may be structured to be integrated into the cameras 1 and the actuator 2 (it may be possible to employ the movement amount detection sensor placed in the motor as described above). Furthermore, although the actuator 2 is presupposed here to undergo the feedback control and the feedforward control, such control is not necessarily essential.

The viewing condition receiving unit 6f receives the data regarding the viewing condition for the viewer to see the 3D video, such as the base-line length m between human eyes, the screen width w, and the distance d between the base line of human eyes and the screen. In addition, other data is received that is utilized for acquiring the base-line length b of the cameras of the cameras 1 or controlling the convergence angle β, such as the width of the imaging element of the cameras of the cameras 1. Those data may be input by a user and the like via an input unit such as a keyboard, or may be transmitted automatically by any means. In addition, the base-line length m between human eyes is structured to be received at the viewing condition receiving unit 6f in the present embodiment, and a preset constant (60 mm, for example) can be registered. In this case, the constant can be used as the base-line length m between human eyes.

The set value receiving unit 6g receives the designation data designated by a user and the like that is the presupposition for acquiring the base-line length b of the cameras of the cameras 1, or for controlling the convergence angle β. For example, a parallax receiving unit for receiving the designated parallax and a drawing ratio receiving unit for receiving the designated drawing ratio are included. Furthermore, a depth-to-breadth ratio receiving unit for receiving the designated depth-to-breadth ratio and a breadth magnification ratio unit for receiving the designated breadth magnification ratio are included. An acceptable parallax range receiving unit for receiving the acceptable parallax range is also included which is utilized for the adjustment of the safe parallax. These designated data are usually input and registered by a user and the like via an input unit such as a key board.

The encoder unit 6h gives a necessary processing to the video received at the video data receiving unit 6a to encode it into a predetermined data format, and then outputs the encoded data as the 3D video data.

The convergence angle calculation unit 6i receives the rotation angle θ from the rotation angle measurement device 3d, and calculates and stores the convergence angle β of the cameras of the cameras 1 based on the data. The value of the convergence angle β is transmitted to the camera control unit 6e, as well as transmitted to the shooting condition receiving unit 6b.

Next, the control method at the shooting control processing unit 6d will be described.

[Control Based on Integration Model Equation 1]

The shooting control processing unit 6*d* carries out the controls with some patterns using the relationship expressed by the integration model equation 1 described above. Four representative patterns will be described here.

First Control

As shown in the integration model equation 1, a suitable base-line length magnification ratio (b/m) is proportional to the drawing ratio h of the object×the depth-to-breadth ratio q of the object. The drawing ratio h is calculated using the actual distance y to the object and the sensing distance z thereof. Here, in order to eliminate the problem of cardboard effect effectively, the depth-to-breadth ratio q of the object in the integration model equation 1 is set to a preset value 1.

In such a case, namely in the case where the depth-to-breadth ratio q of the object is designated to be a constant, the suitable base-line length magnification ratio (b/m) is proportional to the drawing ratio h of the object. However, the depth-to-breadth ratio q of the object can be other predetermined function (where the constant is a kind of function (a constant function)). In this case, the suitable base-line length magnification ratio (b/m) and the drawing ratio h of the object have the relationship in which the predetermined function relates them to each other. Here, the predetermined function can be expressed as a function of the actual distance y which will be 1 when the object and the cameras 1 are close to each other, while being 0.5 when they are far from each other. Furthermore, the depth-to-breadth ratio q of the object also can be expressed by the following equation (the predetermined function), where k is a coefficient.

$$q = k^{2/3} \quad \text{(Equation 17)}$$

In the integration model equation 1, the depth-to-breadth ratio q of the object is the function of the actual distance y to the object, the base-line length b of the camera, the distance g between the cameras and the convergence plane, and the normalized angle of view r.

Thus, the base-line length of the cameras of the cameras 1 can be acquired by the integration model equation 1. The base-line length determination unit 6*d*-1 determines the base-line length of the cameras of the cameras 1 in this manner to transmit the determined base-line length b to the camera control unit 6*e*, so that the base-line length of the cameras of the cameras 1 is adjusted to be the determined base-line length b through the control by means of the camera control unit 6*e*.

The base-line length b of the cameras of the cameras 1 can be acquired by obtaining the actual distance y to the object, the sensing distance z of the object, and the base-line length m between human eyes. The measured result of the actual distance measurement device 3*b* can be used for the actual distance y to the object. Furthermore, the actual distance y to the object can be calculated by the parallax information p of the object, the base-line length b of the cameras of the cameras 1, the distance g between the base line of the cameras of the cameras 1 and the convergence plane, and the normalized angle of view r, so that the determination of the values other than the base-line length b of the cameras of the cameras 1 can resultingly determine the base-line length b of the cameras of the cameras 1.

The parallax information p of the object can be acquired from both the parallax transmitted from the parallax calculation unit 6*c* and the screen width w. The distance g between the base line of the cameras of the cameras 1 and the convergence plane can be acquired from the base-line length b of the cameras of the cameras 1 and the convergence angle β, as described above. The convergence angle β can be acquired based on the rotation angle measured at the rotation angle measurement device 3*d*, and, for example, the convergence angle θ stored in the convergence angle calculation unit 6*i* is transmitted to the shooting control processing unit 6*d* via the shooting condition receiving unit 6*b*. The normalized angle of view r can be acquired from the angle of view α of the cameras of the cameras 1 as described above, and the angle of view α is acquired from the angle of view measured at the angle of view measurement device 3*a*, or from the focal distance of the cameras of the cameras 1 and the width of the imaging element of the cameras of the cameras 1 received at the shooting condition receiving unit 6*b*. The value that is input from the viewing condition receiving unit 6*f* by a user and the like can be used as the width of the imaging element of the cameras of the cameras 1.

The sensing distance z of the object is calculated using the parallax information p of the object and the viewing condition (i.e., the base-line length m between human eyes, the screen width w, and the distance d between the base line of human eyes and the screen).

Second Control

In a second control, a value of the parallax is designated by a user and the like. When the set value receiving unit 6*g* provides the shooting control processing unit 6*d* with the value of the parallax designated by a user and the like, the convergence angle control unit 6*d*-2 controls the camera control unit 6*e* so that the designated parallax is maintained while receiving the parallax calculated at the parallax calculation unit 6*c* on the basis of the video data which is shot by the cameras 1, thereby adjusting the convergence angle β (the feedback control (PID control)).

Here, in the integration model equation 1, the designation of the parallax makes it possible to acquire the parallax information p (w is known), and then the sensing distance z of the object is acquired from the parallax information p and the viewing condition (the base-line length m between human eyes, the screen width w, and the distance d between the base line of human eyes and the screen). Then, the actual distance y to the object that is varied due to the adjusted convergence angle β is grasped. The base-line length determination unit 6*d*-1 of the shooting control processing unit 6*d* acquires the varied drawing ratio h from the actual distance y to the object and the sensing distance z of the object, and determines the base-line length b based thereon. Then, the camera control unit 6*e* controls the base-line length of the cameras of the cameras 1 to be the determined base-line length b.

In addition, the measured result by the actual distance measurement device 3 can be used for the actual distance y to the object, while the base-line length b can determined finally without using the measured result as described in the first control.

Furthermore, in the second control, it is possible to asynchronously execute the process to adjust the convergence angle β and the like and the process to control the base-line length b after the designation of the parallax by a user.

Third Control

In a third control, a value of the drawing ratio h of the object is designated by a user and the like. The set value receiving unit 6*g* provides the shooting control processing unit 6*d* with the value of the drawing ratio h of the object designated by a user and the like. The base-line length determination unit 6*d*-1 of the shooting control processing unit 6*d* acquires the base-line length b based on the designated drawing ratio h, and then the camera control unit 6*e* controls the base-line length of the cameras of the cameras 1 to be the determined base-line length b.

Then, the shooting control processing unit 6d acquires the sensing distance z of the object from the designated drawing ratio h and the actual distance y to the object, and further acquires the parallax information p and the parallax from the sensing distance z of the object and the viewing condition (m, w, and d are known). Then, the convergence angle control unit 6d-2 carries out the feedback control (PID control) of the convergence angle β by the control by the camera control unit 6e so that the acquired parallax is maintained while receiving the parallax calculated at the parallax calculation unit 6c on the basis of the video data which is shot by the cameras 1.

In addition, the measured result by the actual distance measurement device 3b can be used for the actual distance y to the object, while the actual distance y can determined without using the measured result as described in the first control.

Furthermore, in the third control, it is possible to asynchronously execute the process to adjust the convergence angle β and the like and the process to control the base-line length b after the designation of the parallax by a user, likewise the second control.

Fourth Control

In a fourth control, the value of the depth-to-breadth ratio q, which has been employed as being the preset value 1 or the other predetermined function, is set as a value designated by a user and the like. The set value receiving unit 6g provides the shooting control processing unit 6d with the value of the depth-to-breadth ratio q designated by a user and the like. In the processing of the first to third controls described above, the shooting control processing unit 6d carries out the determination of the base-line length, etc., using the value designated here (instead of the former value) as the depth-to-breadth ratio q.

[Control Based on Integration Model Equation 1 and Integration Model Equation 2]

The shooting control processing unit 6d carries out the controls with some patterns using the relationship expressed by the integration model equation 1 and the integration model equation 2 described above. Two representative patterns will be described here.

Fifth Control

As expressed by the integration model equation 2, multiplying the drawing ratio h of the object by the breadth magnification ratio s of the object, by a viewing distance magnification ratio (d/w) and by the normalized angle of view r equals the constant (=1). Here, in order to control the problem of cardboard effect effectively, a zoom of the cameras of the cameras 1 is adjusted to vary the angle of view α, thereby maintaining the breadth magnification ratio s of the object to be 1. Furthermore, since the viewing distance magnification ratio (d/w) is previously input by a user and the like as a viewing condition, multiplying the drawing ratio h of the object by the normalized angle of view r also equals the constant.

The breadth magnification ratio s of the object can be not the constant but a predetermined function, likewise the aforementioned depth-to-breadth ratio q of the object. In accordance with the integration model equation 2, the breadth magnification ratio s of the object is a function of the actual distance y to the object, the base-line length b of the camera, the distance g between the camera and the convergence plane, and the normalized angle of view r.

Here, the shooting control processing unit 6d acquires the normalized angle of view r by the angle of view a measured by the angle of view measurement device 3a or acquired from the focal distance based on the integration model equation 2, thereby calculating the suitable drawing ratio h.

Then, the base-line length determination unit 6d-1 determines the base-line length b from the calculated drawing ratio h, and the camera control unit 6e controls the base-line length of the cameras of the cameras 1 to be the determined base-line length b.

Furthermore, the shooting control processing unit 6d acquires the sensing distance z of the object from the calculated drawing ratio h and the actual distance y to the object based on the integration model equation 1, and further acquires the parallax information p and the parallax from the sensing distance z of the object and the viewing condition (m, w, and d are known). Here, the convergence angle control unit 6d-2 carries out the feedback control (PID control) of the convergence angle β by the control by the camera control unit 6e so that the acquired parallax is maintained while receiving the parallax calculated at the parallax calculation unit 6c on the basis of the video data which is shot by the cameras 1.

In addition, the measured result by the actual distance measurement device 3b can be used for the actual distance y to the object, while the actual distance y can determined without using the measured result as described in the first control.

Furthermore, in the fifth control, it is possible to asynchronously execute the process to adjust the convergence angle β and the process to control the base-line length b after the drawing ratio h is calculated.

Sixth Control

In a sixth control, a value of the breadth magnification ratio s that is maintained as being 1 in the fifth control is set to the value designated by a user and the like. The set value receiving unit 6g provides the shooting control processing unit 6d with the value of the breadth magnification ratio designated by a user and the like. In the processing of the fifth control described above, the shooting control processing unit 6d carries out the control of the convergence angle, etc., using the value designated here for the breadth magnification ratio s.

[Control Based on the Safety]

The shooting control processing unit 6d can carry out a seventh control with regard to the safety of the 3D video. The shooting control processing unit 6d controls the base-line length b and the convergence angle β so that the parallax is within the safe range based on a predetermined guideline such as the safety guidelines regarding 3D (3DC Safety Guidelines (3D Consortium, Safety Guidelines Sub-Committee)).

The shooting condition adjustment unit 6d-3 of the shooting control processing unit 6d determines an acceptable range at the next time of day (referred to the maximum value b_upper(t+1) in particular) using the following equation 18, using an acceptable parallax range (p_lower, p_upper) designated previously by a user and the like and received from the set value receiving unit 6g, the current value of the parallax range of the entire image (p_min(t), p_max(t)) calculated by the parallax calculation unit 6c, and the current base-line length b of the cameras of the cameras 1 (t) received from the base-line length measurement device 3c. Here, the parallax of the entire image refers to the parallax regarding not a part of characteristic points with regard to the image shot by the cameras 1, but all or most pixels. The acquiring of the parallax makes it possible to obtain the parallax range of the entire image (p_min(t), p_max(t)).

$$b\_upper(t+1) = b(t) \cdot (p\_upper - p\_lower)/(p\_max(t) - p\_min(t)) \quad \text{(Equation 18)}$$

As shown in the equation 18, the upper limit of the base-line length b b_upper(t+1) at next time of day (t+1) is defined based on the difference between the maximum value and the minimum value of the base-line length b (t) at the current time of day (t) and the parallax range of the entire image, as well as the ratio of difference between the upper limit and the lower limit of the acceptable parallax range.

Furthermore, the shooting condition adjustment unit 6d-3 determines the acceptable range of the convergence angle at next time of day using the following equations 19 and 20, using an acceptable parallax range (p_lower, p_upper) designated previously by a user and the like and received from the set value receiving unit 6g, the current value of the parallax range of the entire image (p_min(t), p_max(t)) calculated by the parallax calculation unit 6c, and the current convergence angle 0 of the cameras of the cameras 1 (t) stored in the convergence angle calculation unit 6i.

$$\beta\_upper(t+1) = \beta(t) + \delta(p\_max(t) < p\_upper) \quad \text{(Equation 19)}$$
$$= \beta(t) - \delta(p\_max(t) > p\_upper)$$

$$\beta\_lower(t+1) = \beta(t) + \delta(p\_min(t) > p\_lower) \quad \text{(Equation 20)}$$
$$= \beta(t) - \delta(p\_min(t) < p\_lower)$$

Here, the magnitude of δ can be adjusted as appropriate in accordance with a variety of elements such as the difference between the acceptable parallax range and the parallax of the entire image, the time of day (t), etc. For example, the value such as 0.01 degree can be used.

As can be understood from the equation 19, the upper limit of the convergence angle β_upper(t+1) at the next time of day (t+1) is acquired based on the convergence angle β(t) at the current time of day (t). If the maximum value of the parallax of the entire image (p_max(t)) exceeds the upper limit of the acceptable parallax range (p_upper), the value obtained by subtracting δ from β(t) is set as β_upper(t+1), whereas, if the maximum value of the parallax of the entire image (p_max(t)) is smaller than the upper limit of the acceptable parallax range (p_upper), the value obtained by adding β(t) to δ is set as β_upper(t+1). Likewise, from the equation 19, with regard to the lower limit of the convergent angle β_lower(t+1) at the next time of day (t+1), if the minimum value of the parallax of the entire image (p_min(t)) is smaller than the lower limit of the acceptable parallax range (p_lower), the value obtained by subtracting β(t) from δ is set as β_lower(t+1), whereas, if the minimum value of the parallax of the entire image (p_min (t)) exceeds the lower limit of the acceptable parallax range (p_lower), the value obtained by adding δ to β(t) is set as β_lower(t+1).

Also here, if the maximum value of the parallax of the entire image (p_max(t)) exceeds the upper limit of the acceptable parallax range (p_upper) and also the minimum value of the parallax of the entire image (p_min(t)) is smaller than the lower limit of the acceptable parallax range (p_lower), b_upper(t+1) is set to be the value smaller than b(t) so that the base-line length is adjusted to be smaller, based on the equation 18. The parallax of the entire image is thus kept within the acceptable range resultingly over time.

The shooting condition adjustment unit 6d-3 checks the details in the determination and control by the base-line length determination unit 6d-1 or the convergence angle control unit 6d-2, and adjusts the base-line length b and the convergence angle β to fall within the range if the base-line length b exceeds the upper limit of the base-line length b b_upper(t+1) and if the convergence angle β exceeds the range of the convergence angle (β_lower(t+1) to β_upper(t+1)). Furthermore, in the 3D video shooting control system 7 according to an embodiment of the present invention, such adjustment function for the base-line length b and the convergence angle β by the shooting condition adjustment unit 6d-3 is not essential, but can be integrated appropriately when required.

The 3D video shooting control system 7 according to an embodiment of the present invention which has been described so far with reference to FIGS. 1 to 5 provides the cameras 1 consisting of a pair of cameras. However, a plurality of camera sets (pairs of cameras) can be used so that a plurality of 3D shooting can be carried out at once corresponding to a plurality of viewing conditions. The control device 6 can determine suitable base-line length and convergence angle for each of camera sets, and control the position and direction of the corresponding camera set.

In the case that the 3D video shooting control system 7 is provided with four cameras (a camera A, a camera B, a camera C, and a camera D), a plurality of camera sets such as (the camera A+the camera B), (the camera C+the camera D), (the camera A+the camera B), (the camera A+the camera C), and (the camera A+the camera D) can be constituted.

Figure 6:
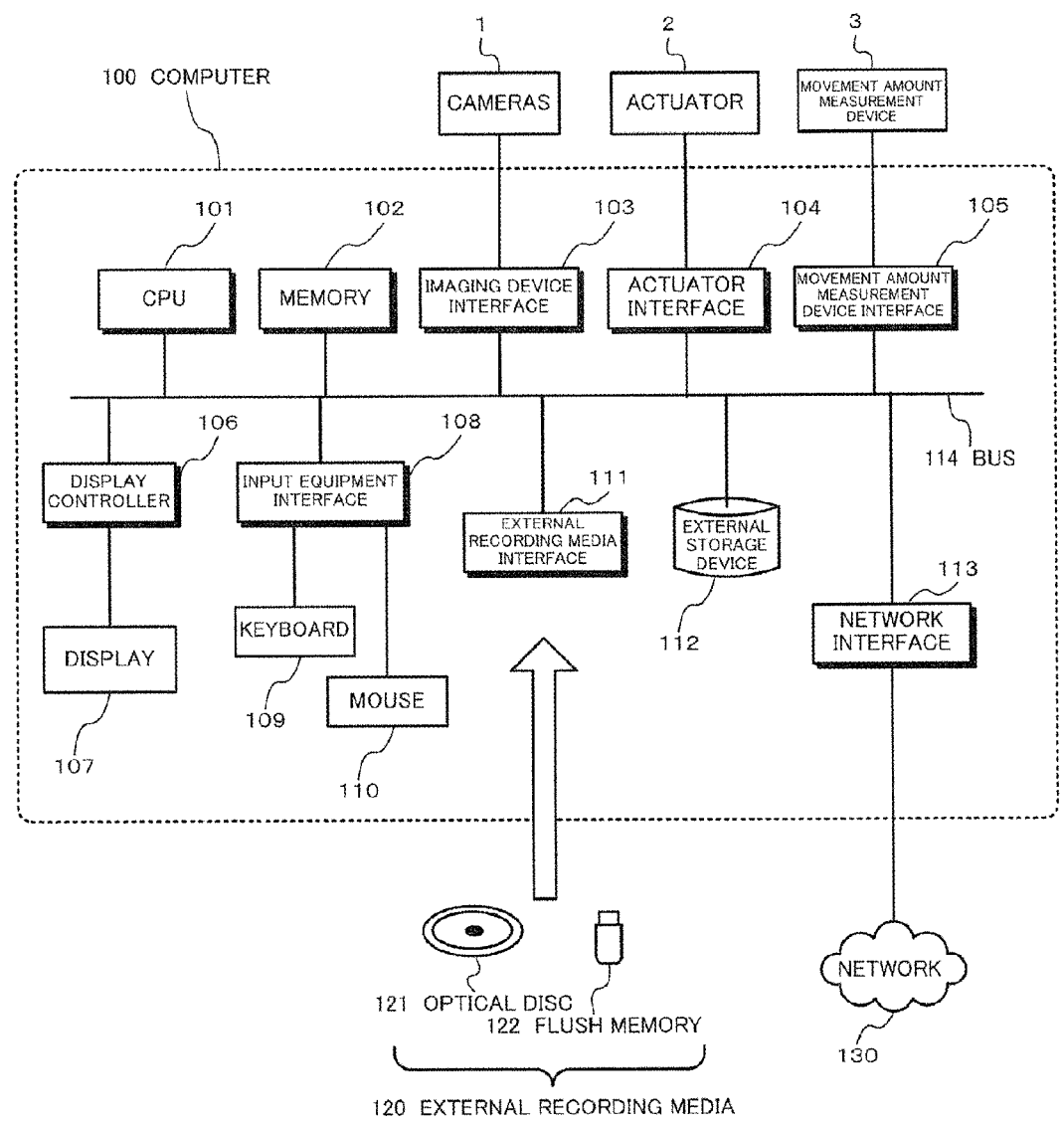
FIG. 6 is a schematic diagram showing an example of a hardware configuration of a computer constituting the control device of the 3D video shooting control system according to an embodiment of the present invention.

Then, a configuration example of a computer constituting the control device 6 of the 3D video shooting control system 7 according to an embodiment of the present invention will be described with reference to FIG. 6. Note that a computer 100 in FIG. 6 is nothing more than an illustration of a representative configuration which achieves each function of the control device 6.

The computer 100 includes a CPU (Central Processing Unit) 101, a memory 102, an imaging device interface 103, an actuator interface 104, a movement amount measurement device interface 105, a display controller 106, a display 107, an input equipment interface 108, a keyboard 109, a mouse 110, an external recording media interface 111, an external storage device 112, a network interface 113, and a bus 114 for connecting these components with one another.

The CPU 101 controls the operation of each component of the computer 100 and executed each function under the control of OS. For example, the control is executed for the processing of the parallax calculation unit 6c and the shooting control processing unit 6d shown in FIG. 5.

The memory 102 is generally composed of a RAM (Random Access Memory). The memory 102 loads a program for achieving each function (such as the function of the parallax calculation unit 6c and the shooting control processing unit 6d) executes in the CPU 101, and temporarily stores data necessary for the program (such as the current convergence angle β and angle of view α).

The imaging device interface 103 is connected to the cameras 1 (each of the left-image shooting camera 1-L and the right-image shooting camera 1-R), and controls the transmission/reception to/from the cameras 1 to receive video data and the like from the cameras 1.

The actuator interface 104 is connected to the actuator 2 to transmit the control data for controlling the operation of the actuator to the actuator 2. The movement amount measurement device interface 105 receives the measured data, such as an angle and a distance, from the movement amount measurement device 3.

The display controller 106 carries out the processing of a rendering data transmitted from the CPU 101 and the like to display it on the display 107 including a display device composed of an LCD (a liquid crystal display) and a touch screen. For example, in the case that a set value is input by a user and the like to the control device 6, a set value input display screen is displayed on the display 107.

The input equipment interface 108 receives the signal from the input device such as the keyboard 109, the mouse 110, the touch screen, etc., which is operated by a user for carrying out the input to the control device 6, and then transmit it to the CPU 101. Moreover, the input data and the like is stored in the memory 102.

The external recording media interface 111 accesses the external recording media 120 to control the transmission/reception of the data. For example, an optical disc 121 is driven to access a recording surface, and then the data recorded thereon is read out or the data stored in the external recording device 112 is written on the optical disc 121. Furthermore, a transportable flush memory 122 is accessed to exchange data with the computer 100.

The external recording device 112 is generally a storage device such as a hard disc. The external recording device 112 stores a program for achieving each function executed in the CPU 101, and stores the data utilized by the program.

The network interface 113 achieves the connection with a network 130 including LAN and the Internet, and controls the transmission/reception of the data between the computer 100 and the network 130. The network interface 113 enables the computer 100 to transmit/receive data by connecting LAN and the Internet. The program that is executed in the CPU 101 to achieve each function of the present invention can be provided from outside to the computer 100 via the network interface 113 and the external recording media interface 111 described above.

Furthermore, all or a part of the program for achieving each function of the present invention may be on-chip to be distributed to the market.

What is claimed is:

1. A 3D video shooting control system for controlling a 3D video shooting, comprising:
    a parallax calculation unit for calculating a parallax regarding an object from a video obtained from a pair of imaging devices, the imaging devices taking a shot of the object;
    a base-line length determination unit for determining a base-line length of the pair of imaging devices; and
    a base-line length control unit for controlling the pair of imaging devices to move so that the base-line length thereof is the determined base-line length, wherein:
    the base-line length determination unit determines the base-line length of the pair of imaging devices based on a relationship between a ratio between the base-line length of the pair of imaging devices and a base-line length between human eyes, and a drawing ratio representing a ratio between an actual distance representing a distance from the base-line of the pair of imaging devices to an object at the time of shooting and a sensing distance representing a distance from a base line of human eyes to an object at the time of viewing the 3D video, the relationship corresponding to a predetermined function, and determines the sensing distance based on the parallax.

2. The 3D video shooting control system according to claim 1, further comprising:
    a parallax receiving unit for receiving a designated parallax; and
    a convergence angle control unit for controlling the pair of imaging devices to move in order to adjust a convergence angle, wherein:
    the convergence angle control unit moves the pair of imaging devices so as to obtain the convergence angle corresponding to the designated parallax; and
    the base-line length determination unit determines the sensing distance based on the designated parallax.

3. The 3D video shooting control system according to claim 1, further comprising:
    a drawing ratio receiving unit for receiving a designated drawings ratio; and
    a convergence angle control unit for controlling the pair of imaging devices to move in order to adjust a convergence angle, wherein:
    the convergence angle control unit moves the pair of imaging devices so as to obtain the convergence angle corresponding to the parallax obtained based on the designated drawing ratio; and
    the base-line length determination unit determines the base-line length of the pair of imaging devices based on the designated drawing ratio.

4. The 3D video shooting control system according to claim 1, further comprising a convergence angle control unit for controlling the pair of imaging devices to move in order to adjust a convergence angle, wherein:
    the drawing ratio is acquired from an angle of view of the pair of imaging devices based on a relationship in which the drawing ratio multiplied by the angle of view equals a constant;
    the convergence angle control unit moves the pair of imaging devices so as to obtain the convergence angle corresponding to the parallax obtained based on the acquired drawing ratio; and
    the base-line length determination unit determines the base-line length of the pair of imaging devices based on the acquired drawing ratio.

5. The 3D video shooting control system according to claim 4, wherein the angle of view is measured by an angle of view measurement unit for measuring an angle of view, or calculated by a focal distance and an imaging element width in the pair of imaging devices.

6. The 3D video shooting control system according to claim 4, further comprising a breadth magnification ratio receiving unit for receiving a designated breadth magnification ratio, wherein:
    the drawing ratio is acquired from the angle of view and the designated breadth magnification ratio based on the relationship in which the drawing ratio multiplied by the angle of view of the pair of imaging devices, and by the designated breadth magnification ratio equals a constant.

7. The 3D video shooting control system according to claim 1, further comprising a depth-to-breadth ratio receiving unit for receiving a designated depth-to-breadth ratio, wherein:
    the base-line length determination unit determines the base-line length of the pair of imaging devices based on the relationship in which a ratio between the base-line length of the pair of imaging devices and the base-line length between human eyes is proportional to the multiplication of the drawing ratio by the designated depth-to-breadth ratio.

8. The 3D video shooting control system according to claim 2, further comprising:
    an acceptable parallax range receiving unit for receiving a designated acceptable parallax range; and
    a shooting condition adjustment unit for adjusting various parameters so that the parallax falls within the acceptable parallax range, wherein:
    the parallax calculation unit calculates a parallax range of the entire image in a video obtained from the pair of imaging devices; and
    the shooting condition adjustment unit determines at least one of the acceptable range with regard to the base-line length of the pair of imaging devices and the acceptable range with regard to the convergence angle in accordance with the calculated parallax range of the entire image and the acceptable parallax range, and adjusts the base-line length of the pair of imaging devices or the convergence angle to be within the determined acceptable range.

9. The 3D video shooting control system according to claim 1, wherein:
the base-line length determination unit acquires the sensing distance based on the parallax and a viewing condition; and
the viewing condition includes a base-line length between human eyes, a screen width, and a distance from the base line of human eyes to the screen.

10. The 3D video shooting control system according to claim 1, wherein the actual distance is measured by an actual distance measurement unit for measuring the actual distance, or is acquired by the parallax, the base-line length of the pair of imaging devices, a convergence angle, and an angle of view.

11. The 3D video shooting control system according to claim 1, wherein the control of the 3D video shooting is carried out for each of two or more pairs of imaging devices composed of three or more imaging devices for shooting the object.

12. A method of 3D video shooting control for controlling a 3D video shooting, comprising the steps of:
a parallax calculation for calculating the parallax with regard to an object from a video obtained from a pair of imaging devices for shooting the object;
a base-line length determination for determining a base-line length of the pair of imaging devices; and
a base-line length control for controlling the pair of imaging devices to move so that the base-line length thereof is the determined base-line length, wherein:
the base-line length determination step determines the base-line length of the pair of imaging devices based on a relationship between a ratio between the base-line length of the pair of imaging devices and a base-line length between human eyes, and a drawing ratio representing a ratio between an actual distance representing a distance from the base-line of the pair of imaging devices to an object at the time of shooting and a distance a sensing distance representing a distance from a base line of human eyes to an object at the time of viewing the 3D video, the relationship corresponding to a predetermined function, and determines the sensing distance based on the parallax.

13. The method of a 3D video shooting control according to claim 12, further comprising the steps of:
a parallax reception for receiving a designated parallax; and
a convergence angle control for controlling the pair of imaging devices to move in order to adjust a convergence angle, wherein:
the convergence angle control step moves the pair of imaging devices so as to obtain the convergence angle corresponding to the designated parallax; and
the base-line length determination step determines the sensing distance based on the designated parallax.

14. The method of a 3D video shooting control according to claim 12, further comprising the steps of:
a drawing ratio reception for receiving the designated drawings ratio; and
a convergence angle control for controlling the pair of imaging devices to move in order to adjust a convergence angle, wherein:
the convergence angle control step moves the pair of imaging devices so as to obtain the convergence angle corresponding to the parallax obtained based on the designated drawing ratio; and
the base-line length determination step determines the base-line length of the pair of imaging devices based on the designated drawing ratio.

15. The method of a 3D video shooting control according to claim 12, further comprising the steps of a convergence angle control for controlling the pair of imaging devices to move in order to adjust a convergence angle, wherein:
the drawing ratio is acquired from an angle of view of the pair of imaging devices based on a relationship in which the drawing ratio multiplied by the angle of view equals a constant;
the convergence angle control step moves the pair of imaging devices so as to obtain the convergence angle corresponding to the parallax obtained based on the acquired drawing ratio; and
the base-line length determination step determines the base-line length of the pair of imaging devices based on the acquired drawing ratio.

16. A non-transitory recording medium for storing program for carrying out the 3D video shooting control for controlling a 3D video shooting, the program making a computer function as:
a parallax calculation unit for calculating a parallax regarding an object from a video obtained from a pair of imaging devices, the imaging devices taking a shot of the object;
a base-line length determination unit for determining a base-line length of the pair of imaging devices; and
a base-line length control unit for controlling the pair of imaging devices to move so that the base-line length thereof is the determined base-line length, wherein:
the base-line length determination unit determines the base-line length of the pair of imaging devices based on a relationship between a ratio between the base-line length of the pair of imaging devices and a base-line length between human eyes, and a drawing ratio representing a ratio between an actual distance representing a distance from the base-line of the pair of imaging devices to an object at the time of shooting and a sensing distance representing a distance from a base line of human eyes to an object at the time of viewing the 3D video, the relationship corresponding to a predetermined function, and determines the sensing distance based on the parallax.

17. The non-transitory recording medium according to claim 16, the program further making the computer function as:
a parallax reception unit for receiving a designated parallax; and
a convergence angle control unit for controlling the pair of imaging devices to move in order to adjust a convergence angle, wherein:
the convergence angle control step moves the pair of imaging devices so as to obtain the convergence angle corresponding to the designated parallax; and
the base-line length determination step determines the sensing distance based on the designated parallax.

18. The non-transitory recording medium according to claim 16, the program further making the computer function as:

a drawing ratio receiving unit for receiving a designated drawings ratio; and a convergence angle control unit for controlling the pair of imaging devices to move in order to adjust a convergence angle, wherein:

the convergence angle control unit moves the pair of imaging devices so as to obtain the convergence angle corresponding to the parallax obtained based on the designated drawing ratio; and the base-line length determination unit determines the base-line length of the pair of imaging devices based on the designated drawing ratio.

19. The non-transitory recording medium according to claim 16, the program further making the computer function as a convergence angle control unit for controlling the pair of imaging devices to move in order to adjust a convergence angle, wherein:

the drawing ratio is acquired from an angle of view of the pair of imaging devices based on a relationship in which the drawing ratio multiplied by the angle of view equals a constant;

the convergence angle control unit moves the pair of imaging devices so as to obtain the convergence angle corresponding to the parallax obtained based on the acquired drawing ratio; and the base-line length determination unit determines the base-line length of the pair of imaging devices based on the acquired drawing ratio.

* * * * *